(12) United States Patent
Bulusu et al.

(10) Patent No.: US 11,593,209 B2
(45) Date of Patent: Feb. 28, 2023

(54) TARGETED REPAIR OF HARDWARE COMPONENTS IN A COMPUTING DEVICE

(71) Applicant: Microsoft Technology Licensing, LLC, Redmond, WA (US)

(72) Inventors: Mallik Bulusu, Bellevue, WA (US); Tom Long Nguyen, Auburn, WA (US); Muhammad Ashfaq Ahmed, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/837,885

(22) Filed: Apr. 1, 2020

(65) Prior Publication Data
US 2021/0311833 A1 Oct. 7, 2021

(51) Int. Cl.
*G06F 11/00* (2006.01)
*G06F 11/14* (2006.01)
(Continued)

(52) U.S. Cl.
CPC ...... *G06F 11/1417* (2013.01); *G06F 11/0772* (2013.01); *G06F 11/0778* (2013.01);
(Continued)

(58) Field of Classification Search
CPC ............ G06F 11/2023; G06F 11/2035; G06F 11/327; G06F 11/0751; G06F 11/0772
See application file for complete search history.

(56) References Cited

U.S. PATENT DOCUMENTS

| 7,120,559 B1 | 10/2006 | Williams et al. |
| 7,774,651 B2 | 8/2010 | Mukherjee et al. |

(Continued)

FOREIGN PATENT DOCUMENTS

| CN | 106600095 A | 4/2017 |
| WO | 2020051921 A1 | 3/2020 |

OTHER PUBLICATIONS

"Bad Page Offlining", Retrieved from: https://web.archive.org/web/20110124005500/http:/mcelog.org/badpageofflining.html, Jan. 24, 2011, 2 Pages.
(Continued)

*Primary Examiner* — Charles Ehne
(74) *Attorney, Agent, or Firm* — Ray Quinney & Nebeker; Tiffany Healy

(57) ABSTRACT

A method for targeted repair of a hardware component in a computing device that is part of a cloud computing system includes monitoring a plurality of hardware components in the computing device. At some point, a defective sub-component within the hardware component of the computing device is identified. In addition to the defective sub-component, the hardware component also includes at least one sub-component that is functioning properly and a spare component that can be used in place of the defective sub-component. The method also includes initiating a targeted repair action while the computing device is connected to the cloud computing system. The targeted repair action prevents the defective sub-component from being used by the computing device without preventing sub-components that are functioning properly from being used by the computing device. The targeted repair action causes the spare component to be used in place of the defective sub-component.

13 Claims, 10 Drawing Sheets

(51) Int. Cl.
  *G06F 11/07* (2006.01)
  *G06F 11/16* (2006.01)
  *G06F 11/20* (2006.01)
  *G06F 11/30* (2006.01)
  *G06F 21/57* (2013.01)
  *G06F 21/73* (2013.01)

(52) U.S. Cl.
  CPC ...... *G06F 11/0787* (2013.01); *G06F 11/1658* (2013.01); *G06F 11/2028* (2013.01); *G06F 11/3006* (2013.01); *G06F 21/577* (2013.01); *G06F 21/73* (2013.01)

(56) References Cited

U.S. PATENT DOCUMENTS

| | | | |
|---|---|---|---|
| 9,652,320 B2 | 5/2017 | Shah et al. | |
| 9,704,601 B2* | 7/2017 | Oh | G11C 29/70 |
| 9,941,023 B2* | 4/2018 | Warnes | G11C 5/148 |
| 2014/0025991 A1 | 1/2014 | Anandavally et al. | |
| 2017/0139411 A1* | 5/2017 | Hartung | G05D 1/0077 |
| 2018/0232052 A1* | 8/2018 | Chizeck | G06T 7/97 |
| 2019/0155632 A1* | 5/2019 | Toy | G06F 11/0793 |

OTHER PUBLICATIONS

"System Event Log (SEL) Troubleshooting Guide", Retrieved from: https://www.intel.com/content/dam/support/us/en/documents/server-products/SEL_TroubleshootingGuide.pdf, Sep. 2019, 118 Pages.

Hudek, et al., "Error Record Persistence Mechanism", Retrieved from: https://docs.microsoft.com/en-us/windows-hardware/drivers/whea/error-record-persistence-mechanism, Apr. 20, 2017, 2 Pages.

Hudek, et al., "Hardware Errors and Error Sources", Retrieved from: https://docs.microsoft.com/en-us/windows-hardware/drivers/whea/hardware-errors-and-error-sources, Apr. 20, 2017, 2 Pages.

Kadav, et al., "Tolerating Hardware Device Failures in Software", In Proceedings of the ACM SIGOPS 22nd Symposium on Operating Systems Principles, Oct. 11, 2009, 16 Pages.

"International Search Report and Written Opinion Issued in PCT Application No. PCT/US2021/024747", dated Jul. 16, 2021, 13 Pages.

* cited by examiner

TARGETED REPAIR OF HARDWARE COMPONENTS IN A COMPUTING DEVICE

CROSS-REFERENCE TO RELATED APPLICATIONS

N/A

BACKGROUND

A cloud computing system includes a large number of servers that deliver computing services over the Internet. Some examples of computing services that can be provided by a cloud computing system include storage, databases, networking, software, and analytics. The use of cloud computing technology has grown rapidly in recent years, due at least in part to the development of high-capacity networks as well as relatively low-cost computers and storage devices.

From time to time, servers within a cloud computing system can have hardware components that malfunction. Although an entire hardware component can sometimes malfunction, under some circumstances only one or more sub-components of a hardware component can malfunction or experience some type of error. For example, one or more memory regions (e.g., rows, columns, cells) within a memory device can malfunction or experience errors, even though other memory regions within the memory device continue to function properly. As another example, in a processor that includes multiple cores, one or more cores can malfunction or experience errors even though other cores continue to function properly.

To provide high availability to users, the servers in a cloud computing system can be configured to employ various techniques to contain or even correct errors that occur. In the context of a memory device, one example of an error containment technique is memory page off-lining. This refers to disabling faulty memory pages containing bad addresses (i.e., one or more faulty memory cells that are accessed or referenced by a logical address) in order to prevent them from being used again by a process. However, one challenge with such an approach is that the memory pages that are off-lined cannot be used by the operating system kernel or user contexts. If the off-lined memory pages are in active use for hosting kernel or user level application/data, this can adversely affect the computing services being provided.

Another technique that is commonly used is error-correcting code (ECC) memory. ECC memory is able to detect and correct certain kinds of internal data corruption, such as single-bit errors. However, the use of ECC memory does not necessarily prevent errors from adversely affecting performance, especially if a particular memory region experiences errors on a frequent basis. Even though those errors can be corrected, the additional time required to correct them can degrade performance.

In view of the foregoing, benefits may be realized by improvements related to repairing defective hardware components in a computing device, especially in a scenario where one or more sub-components of a hardware component are defective but other sub-components continue to function properly. Such improvements would be particularly beneficial in a cloud computing system that includes a large number of computing devices that should have a high degree of availability.

SUMMARY

In accordance with one aspect of the present disclosure, a method is disclosed for targeted repair of a hardware component in a computing device that is part of a cloud computing system. The method includes monitoring a plurality of hardware components in the computing device and identifying a defective sub-component within the hardware component of the computing device. The hardware component also includes at least one sub-component that is functioning properly and a spare component that can be used in place of the defective sub-component. The method also includes initiating a targeted repair action while the computing device is connected to the cloud computing system. The targeted repair action prevents the defective sub-component from being used by the computing device without preventing the at least one sub-component that is functioning properly from being used by the computing device. The targeted repair action causes the spare component to be used in place of the defective sub-component.

Identifying the defective sub-component may include querying an error information repository in response to occurrence of a predetermined event involving the computing device. The error information repository may be maintained in non-volatile storage. The error information repository may include error information identifying the defective sub-component within the hardware component. Identifying the defective sub-component may also include obtaining the error information identifying the defective sub-component in response to the querying.

The predetermined event may include a boot process of the computing device. The targeted repair action may be performed during the boot process.

Identifying the defective sub-component may include detecting an error signal indicating that the hardware component includes the defective sub-component and obtaining error information that identifies the defective sub-component.

The hardware component may include a memory device that is configured with post package repair (PPR) capability. The defective sub-component may include a defective memory region. The memory device may include a spare memory region that can be used in place of the defective memory region. Performing the targeted repair action may include performing a PPR operation that causes the spare memory region to be used in place of the defective memory region.

The hardware component may include a multi-core processor. The defective sub-component may include a defective processor core. The multi-core processor may include a spare processor core that can be used in place of the defective processor core. Performing the targeted repair action may cause the spare processor core to be used in place of the defective processor core.

In accordance with another aspect of the present disclosure, a method is disclosed for deferred targeted repair of a hardware component in a computing device. The method includes querying an error information repository in response to occurrence of a predetermined event involving the computing device. The error information repository is maintained in non-volatile storage. The error information repository may include error information identifying a defective sub-component within the hardware component. The hardware component also includes at least one sub-component that is not defective. The method also includes obtaining the error information identifying the defective sub-component in response to the querying and initiating a targeted repair action on the defective sub-component based at least in part on the error information. The targeted repair action alters the hardware component to prevent the defective sub-component from being used by the computing device without preventing the at least one sub-component that is not defective from being used by the computing device.

The predetermined event may include a boot process of the computing device. The targeted repair action may be performed during the boot process.

The method may further include detecting an error signal corresponding to the defective sub-component and recording the error information identifying the defective sub-component in the error information repository.

The method may further include performing predictive failure analysis on hardware components of the computing device, identifying the defective sub-component based at least in part on the predictive failure analysis, and recording the error information identifying the defective sub-component in the error information repository.

The hardware component may additionally include a spare sub-component that can be used in place of the defective sub-component. The targeted repair action may cause the spare sub-component to be used in place of the defective sub-component.

The hardware component may include a memory device that is configured with post package repair (PPR) capability. The defective sub-component may include a defective memory region. The memory device may include a spare memory region that can be used in place of the defective memory region. Performing the targeted repair action may include performing a PPR operation that causes the spare memory region to be used in place of the defective memory region.

The method may further include testing portions of the memory device corresponding to the error information in the error information repository. The testing may be performed prior to the targeted repair action.

The predetermined event may include a boot process of the computing device. The targeted repair action may be performed during the boot process, before a memory map is finalized for a current boot cycle.

The hardware component may include a multi-core processor. The defective sub-component may include a defective processor core. The multi-core processor may include a spare processor core that can be used in place of the defective processor core. Performing the targeted repair action may cause the spare processor core to be used in place of the defective processor core.

The method further includes publishing repair telemetry corresponding to the targeted repair action.

In accordance with another aspect of the present disclosure, a method is disclosed for live targeted repair of a hardware component in a computing device. The method includes detecting an error signal indicating that the hardware component includes a defective sub-component. The hardware component also includes at least one sub-component that is not defective. The error signal is detected while the computing device is operating and after the computing device has completed a boot process. The method also includes obtaining error information that identifies the defective sub-component and initiating a targeted repair action on the defective sub-component while the computing device is operating and before the computing device begins another boot process. The targeted repair action may alter the hardware component to prevent the defective sub-component from being used by the computing device without preventing the at least one functioning sub-component from being used by the computing device.

The hardware component may additionally include a spare sub-component that can be used in place of the defective sub-component. The targeted repair action may cause the spare sub-component to be used in place of the defective sub-component.

The hardware component may include a memory device that is configured with post package repair (PPR) capability. The defective sub-component may include a defective memory region. The memory device may include a spare memory region that can be used in place of the defective memory region. Performing the targeted repair action may include performing a PPR operation that causes the spare memory region to be used in place of the defective memory region.

The hardware component may include a multi-core processor. The defective sub-component may include a defective processor core. The multi-core processor may include a spare processor core that can be used in place of the defective processor core. Performing the targeted repair action may cause the spare processor core to be used in place of the defective processor core.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
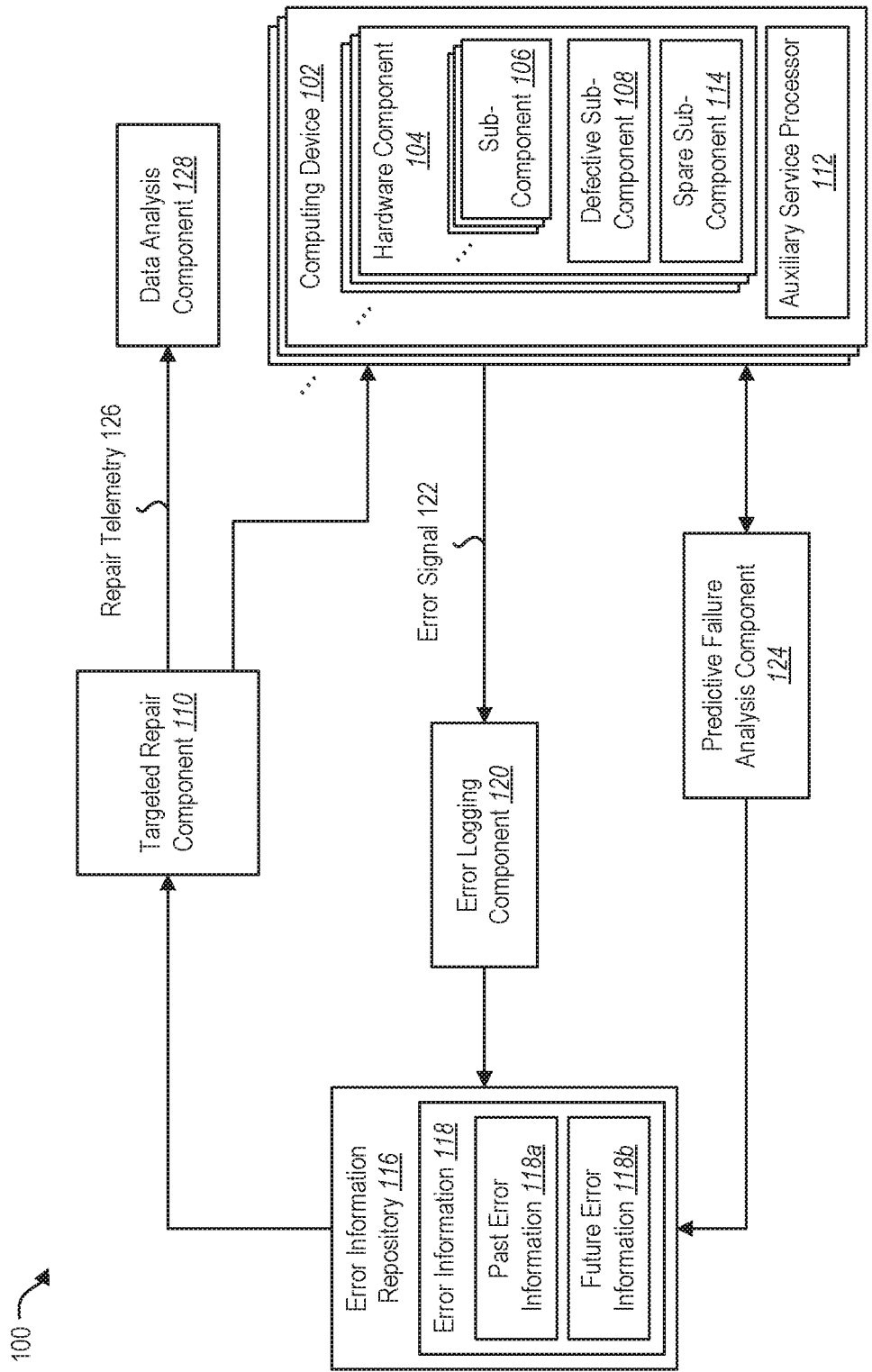
FIG. 1 illustrates an example of a system that is configured for targeted repair of hardware components in computing devices.

The present disclosure is generally related to opportunistic component repair in a computing device. Advantageously, the techniques disclosed herein can target one or more specific sub-components within a hardware component. Thus, if a hardware component includes a defective sub-component as well as one or more sub-components that are not defective, a targeted repair action can be initiated with respect to the defective sub-component. The defective sub-component can be specifically targeted for repair without affecting any of the sub-components that are not defective.

The targeted repair action can alter the hardware component in a way that prevents the defective sub-component from being used by the computing device without preventing any of the other sub-components that are functioning properly from being used by the computing device. In some embodiments, the hardware component can be configured with a spare sub-component, and the targeted repair action can cause the spare sub-component to be substituted for the defective sub-component. In other words, a targeted repair action in accordance with the present disclosure can include a physical change that causes the spare sub-component to be used in place of the defective sub-component.

As an example, suppose that a region of a memory device within a computing device is identified as defective. In accordance with the present disclosure, a targeted repair action can be initiated to repair the defective region of the memory device without affecting other regions of the memory device that are still functioning properly. In some embodiments, a targeted repair action that is performed on a region of a memory device can utilize the post package repair (PPR) capabilities of a memory device. A memory device that is configured with PPR capability includes one or more spare memory regions. A targeted repair action can cause the spare memory region to be used in place of the defective memory region.

As another example, suppose that a computing device includes a multi-core processor, and one of the processor cores is defective. If the processor includes a spare processor core, a targeted repair action can cause the spare processor core to be used in place of the defective processor core.

As another example, a targeted repair operation can be performed on a storage device, such as peripheral component interconnect express (PCIe) based solid state drives (SSDs). In some embodiments, a targeted repair action on a PCIe-based SSD can involve wear-levelling, and it can be applied to certain types of PCIe endpoints such as non-volatile memory express (NVMe) devices.

In some embodiments, if a spare sub-component is not available to replace a defective sub-component (e.g., because all of the spare sub-components have already been used), then a targeted repair operation can simply include taking some action to prevent the defective sub-component from being used by the computing device. For example, in the case of a memory device, a defective memory region can be excluded from addressable memory ranges in a memory map that is created for the ongoing boot cycle.

In addition to physical repairs like causing a spare sub-component to be used in place of a defective sub-component, targeted repair actions in accordance with the present disclosure can also include logical repairs. In some embodiments, a targeted repair action can include taking some action that reduces the likelihood of an error occurring. In other words, if a sub-component experiences errors only under one or more conditions, then a targeted repair action can include configuring a computing device so that the condition(s) do not occur (or are less likely to occur). If a sub-component only (or usually) experiences errors when a particular option has been enabled, then a targeted repair action can include disabling that option. For example, if a sub-component only experiences errors when hyperthreading has been enabled, then then a targeted repair action can include disabling hyperthreading. Another example of a similar type of targeted repair action could include running a memory device at a slower speed.

In some embodiments, whenever errors related to defective sub-components of hardware components in a computing device are detected, information about the errors can be logged to an error information repository that is associated with the computing device. The error information repository can be local to or remote from the computing device. The information in the error information repository can be used to make targeted repairs.

In some embodiments, targeted repair actions for a particular computing device can be deferred until a predetermined event occurs, such as a reboot of the computing device. For example, as part of a boot process, an error information repository that is associated with a computing device can be queried to determine whether it includes information about any defective sub-components within the computing device that should be repaired. A targeted repair action can be initiated for each defective sub-component that is identified. The targeted repair action(s) can also be performed as part of the boot process.

In some embodiments, targeted repair actions for a particular computing device can be performed when errors are detected, without waiting for a predetermined event (such as a boot process) to occur. For example, when an error signal is detected indicating that a sub-component is defective, a targeted repair action can immediately (or soon thereafter) be initiated in response to the error signal, without waiting for a boot process or other similar event to occur. Performing targeted repair actions in this way may be referred to herein as "live" targeted repair.

The techniques disclosed herein can be utilized in a cloud computing system. A cloud computing system can include a large number of computing devices (e.g., servers). In accordance with the present disclosure, a plurality of computing devices in a cloud computing system can each include software and/or firmware that is configured to monitor the hardware components within the computing device and initiate targeted repair actions as appropriate. Advantageously, the targeted repair actions disclosed herein can be performed with minimal interruption to the cloud computing system. Because targeted repair actions can be performed while a computing device is operational, it is not necessary to disconnect the computing device from the cloud computing system in order to repair defective sub-components within hardware components of the computing device.

FIG. 1 illustrates an example of a system 100 in which the techniques disclosed herein can be utilized. The system 100 includes a plurality of computing devices 102. In some embodiments, the computing devices 102 can be part of a cloud computing system that provides computing services over one or more computer networks (typically including the Internet). The techniques disclosed herein can help to ensure that the computing devices 102 are maintained at a high degree of availability for users of the cloud computing system.

Each computing device 102 includes a plurality of hardware components 104. Some examples of hardware components 104 within the computing device 102 include a processor, memory, storage, communication interfaces, input devices, and output devices.

A hardware component 104 within a computing device 102 includes a plurality of sub-components 106. The techniques disclosed herein can be beneficial in a scenario in which most of the sub-components 106 within a hardware component 104 are functioning properly, but the hardware component 104 includes at least one defective sub-component 108. For example, the techniques disclosed herein can be utilized in a scenario in which most of the regions (e.g., cells, rows, columns) within a memory device are functioning properly, but the memory device includes at least one defective region. As another example, the techniques disclosed herein can be utilized in a scenario in which most of the cores within a multi-core processor are functioning properly, but the processor includes at least one defective core.

The system 100 includes a component that is configured to initiate targeted repair actions for defective sub-components 108 within a hardware component 104. This component may be referred to as a targeted repair component 110. The targeted repair component 110 can be configured to specifically target the defective sub-component(s) 108 for repair without affecting any of the other sub-components 106 that are not defective. For example, the targeted repair action can alter the hardware component 104 in a way that prevents the defective sub-component 108 from being used by the computing device 102 without preventing any of the other functioning sub-components 106 from being used by the computing device 102.

Although FIG. 1 shows the targeted repair component 110 separately from the plurality of computing devices 102, in some embodiments a targeted repair component 110 that performs targeted repair actions on a particular computing device 102 can be implemented within the computing device 102 itself. For example, the targeted repair component 110 can be implemented in firmware and/or in software that runs on the computing device 102. In some embodiments, at least some aspects of the targeted repair component 110 can be implemented in an operating system within the computing device 102.

As another example, in some embodiments at least some aspects of the targeted repair component 110 can be implemented in an auxiliary service processor 112 within the computing device 102. An auxiliary service processor 112 is a specialized microcontroller within the computing device 102, separate from the general purpose processor. One example of an auxiliary service processor 112 is a baseboard management controller (BMC). As another example, in some specific process architectures, the Manageability Engine or Server Processor Services (SPS) serve the role of an auxiliary service processor 112. As another example, certain low end devices may have an embedded controller (EC) that serves this purpose.

It can be useful for auxiliary service processors 112 to be included in computing devices 102 within a cloud computing system because they allow system administrators to perform various tasks remotely. For example, a system administrator can remotely communicate with an auxiliary service processor 112 to take corrective actions, such as resetting or power cycling a computing device 102. In accordance with the present disclosure, such corrective actions can also include performing targeted repair of one or more sub-components 106 within a hardware component 104 that is part of a computing device 102.

As another example, in some embodiments a targeted repair component 110 that performs targeted repair actions on a particular computing device 102 can be implemented in software and/or firmware that runs on one or more other devices that are separate from the computing device 102.

In some embodiments, a targeted repair action can involve one or more spare sub-components 114. A spare sub-component 114 can be an extra sub-component within a hardware component 104. In other words, the hardware component 104 may be able to function properly without using the spare sub-component 114, but having the spare sub-component 114 can be useful because it allows a defective sub-component 108 to be replaced. In some embodiments, a targeted repair action that is performed with respect to a defective sub-component 108 can cause the spare sub-component 114 to be used in place of the defective sub-component 108.

The system 100 also includes an error information repository 116 that is associated with the computing device 102. The error information repository 116 can be implemented using non-volatile storage. Whenever errors related to defective sub-components 106 of hardware components 104 in a computing device 102 are detected, information 118 about the errors can be logged to the error information repository 116.

Although FIG. 1 shows the error information repository 116 separately from the plurality of computing devices 102, in some embodiments an error information repository 116 that stores error information 118 about a particular computing device 102 can be implemented within the computing device 102 itself. For example, in some embodiments the error information repository 116 can be implemented as an event log within an auxiliary service processor 112. Alternatively, the error information repository 116 can be implemented separately from the auxiliary service processor 112 within the computing device 102, and/or on one or more other devices that are separate from the computing device 102.

The error information repository 116 is shown with two different types of error information 118: past error information 118a and future error information 118b. Broadly speaking, the past error information 118a includes information about errors that have already occurred. The future error information 118b includes information about errors that are predicted to occur in the future. The future error information 118b can be based on the results of predictive failure analysis that is performed with respect to hardware components 104 in the computing device 102.

The system 100 includes an error logging component 120 that is configured to detect errors related to defective sub-components 106 of hardware components 104 in a computing device 102 and record information describing those errors (e.g., past error information 118a) in the error information repository 116.

In some embodiments, errors can be detected based on error signals 122. For example, when a particular sub-component 108 of a hardware component 104 malfunctions (or is otherwise determined to be defective in some way), an error signal 122 can be generated. In some embodiments, the error signal 122 can be generated by the hardware component 104 itself. Alternatively, the error signal 122 can be generated by another component that is distinct from the hardware component 104. For example, the error signal 122 can be generated by an auxiliary service processor 112, or another component within the computing device 102 that is monitoring the status of the hardware component 104. Alternatively, the error signal 122 can be generated by a component that is external to the computing device 102 and that is monitoring the status of the hardware component 104.

When the error logging component 120 detects an error signal 122 indicating that a particular sub-component 108 has malfunctioned, the error logging component 120 can write error information 118a to the error information repository 116. The error information 118a can include information that identifies the defective sub-component 108. For example, if the hardware component 104 is a memory device and the defective sub-component 108 is a particular region within the memory device, the error information 118a can include the address of the defective memory region. As another example, if the hardware component 104 is a processor that includes multiple cores and the defective sub-component 108 is a particular core within the processor, the error information 118a can include an indication about which core is defective.

Although FIG. 1 shows the error information repository 116 separately from the plurality of computing devices 102, in some embodiments an error logging component 120 that records error information 118a about a particular computing device 102 can be implemented within the computing device 102 itself. For example, in some embodiments the error logging component 120 can be implemented within the auxiliary service processor 112 and/or in software and/or firmware that runs on the computing device 102. Alternatively, the error logging component 120 can be implemented in software and/or firmware that runs on one or more other devices that are separate from the computing device 102.

The system 100 shown in FIG. 1 also includes a component 124 that is configured to perform predictive failure analysis with respect to the computing device 102 and to determine future error information 118b indicating errors that are likely to occur in the future. This component 124 may be referred to herein as a predictive failure analysis component 124. The predictive failure analysis component 124 can be configured to record future error information 118b in the error information repository 116. In some embodiments, performing predictive failure analysis can include running synthetic workloads on a plurality of computing devices 102 and analyzing the results of those workloads. Targeted repair actions as described herein can be based at least in part on past error information 118a recorded by the error logging component 120 and/or on future error information 118b recorded by the predictive failure analysis component 118b.

In some embodiments, the predictive failure analysis component 124 that performs predictive failure analysis with respect to a particular computing device 102 can be implemented within the computing device 102 itself. For example, in some embodiments the predictive failure analysis component 124 can be implemented as part of an operating system within the computing device 102. As another example, the predictive failure analysis component 124 can be implemented in other software and/or firmware that runs on the computing device 102. Alternatively, the predictive failure analysis component 124 can be implemented in software and/or firmware that runs on one or more other devices that are separate from the computing device 102.

Broadly speaking, there are at least two different scenarios in which targeted repair actions for a particular computing device 102 can be performed. In a first scenario, targeted repair actions for a particular computing device 102 can be deferred until a predetermined event occurs. This first scenario can be referred to as deferred targeted repair. In a second scenario, targeted repair actions can be performed when errors are detected, without waiting for a predetermined event to occur. This second scenario can be referred to as live targeted repair. There can be two variants of the second scenario. In some embodiments, repair can be performed instantaneously. In other embodiments, the repair that is performed in connection with a particular error can be performed as a part of a polled service after the occurrence of the error. The polling interval may be configured via a platform policy for the specific computing device.

In the deferred targeted repair scenario, targeted repair actions for a particular computing device 102 can be deferred until a predetermined event occurs, such as a reboot of the computing device 102. When the predetermined event occurs, the targeted repair component 110 can query the error information repository 116 to determine whether there are any defective sub-components 108 within the computing device 102 that should be repaired. In response to the query, the targeted repair component 110 can receive information identifying one or more defective sub-components 108. The targeted repair component 110 can then initiate a targeted repair action for each defective sub-component 108. The targeted repair action(s) can be performed as part of the boot process.

In the live targeted repair scenario, targeted repair actions for a particular computing device 102 can be performed when errors are detected, without waiting for a predetermined event to occur. In some embodiments, one or more targeted repair actions can be performed in response to an error signal 122 being detected. For example, suppose that a targeted repair component 110 detects an error signal 122 indicating that a sub-component 108 of a hardware component 104 within a computing device 102 is defective. The error signal 122 can include information identifying the specific sub-component 108 that is defective. In response to receiving the error signal 122, the targeted repair component 110 can then perform a targeted repair action on the defective sub-component 108. The targeted repair action can be performed immediately (or soon after) the error signal 122 is received, without waiting for a boot process or other similar event to occur.

Once a targeted repair action has been performed, repair telemetry 126 about the targeted repair action can be provided to one or more entities. FIG. 1 shows a data analysis component 128 receiving repair telemetry 126 from the targeted repair component 110. Over time, the data analysis component 128 can receive repair telemetry 126 corresponding to a plurality of different repair actions that are performed with respect to a plurality of different hardware components 104. The data analysis component 128 can be configured to analyze this repair telemetry 126 and determine characteristics of and trends related to the hardware components 104 in the computing devices 102. The information that is obtained from this kind of analysis can be used in a variety of different ways. As an example, the various computing devices 102 in a cloud computing system can include hardware components 104 from different hardware vendors, and the information that is obtained from analyzing the repair telemetry 126 from various repair actions can be used to assess the reliability of hardware components 104 made by different hardware vendors. The results of such an assessment can be used to guide future purchasing decisions for the cloud computing system.

Figure 2:
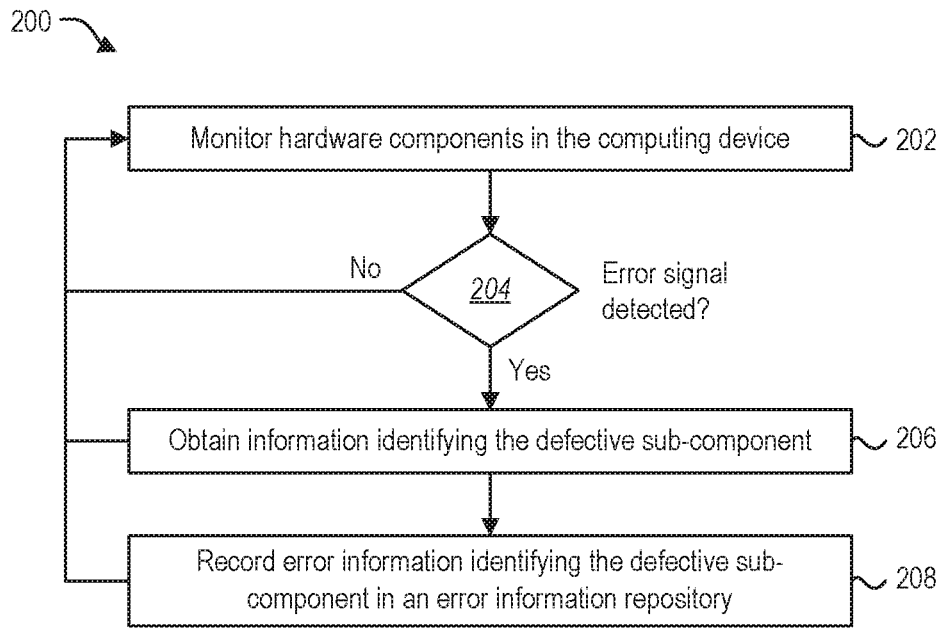
FIG. 2 illustrates operations that can be performed by an error logging component as part of a method for deferred targeted repair of hardware components in computing devices.
Figure 3:
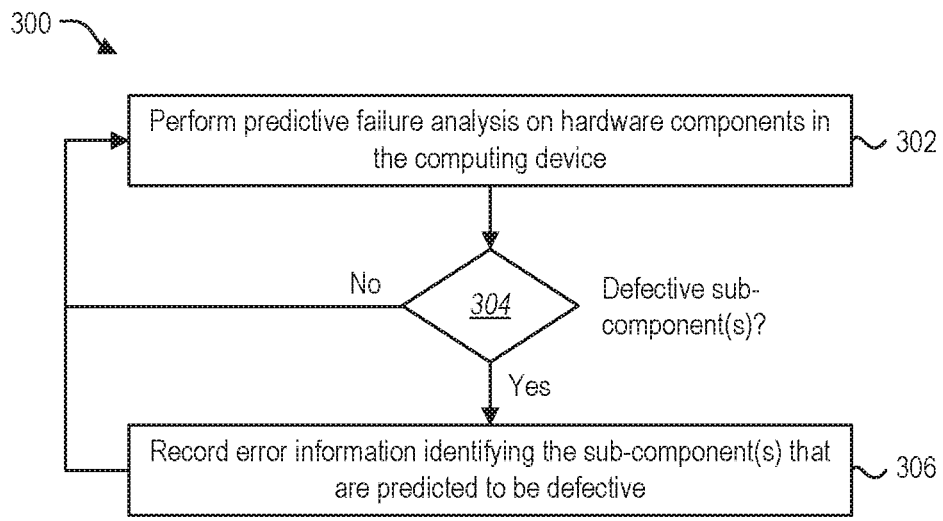
FIG. 3 illustrates operations that can be performed by a predictive failure analysis component as part of a method for deferred targeted repair of hardware components in computing devices.
Figure 4:
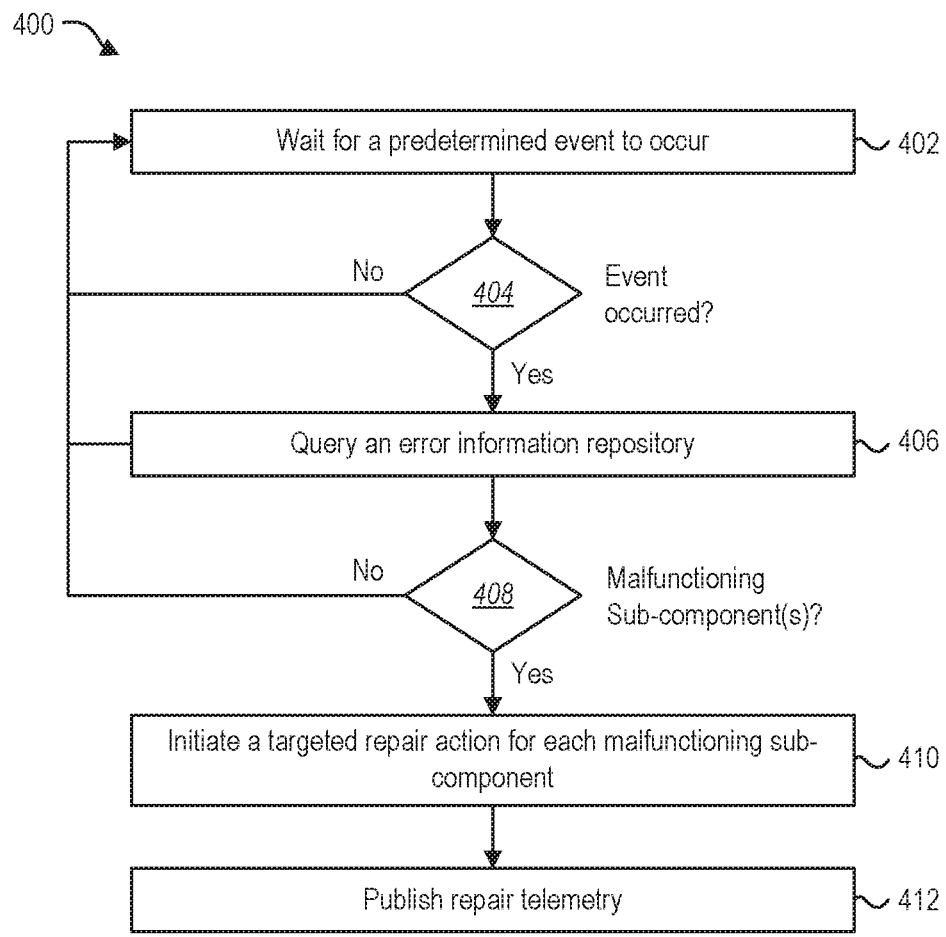
FIG. 4 illustrates operations that can be performed by targeted repair component as part of a method for deferred targeted repair of hardware components in computing devices.

FIGS. 2-4 illustrate various methods 200, 300, 400 that can be performed in to implement deferred targeted repair. More specifically, the methods 200, 300, 400 shown in FIGS. 2-4 illustrate various aspects of a scenario in which targeted repair actions for a computing device 102 are deferred until a predetermined event occurs, such as a reboot of a computing device 102. These methods 200, 300, 400 will be described in relation to the system 100 shown in FIG. 1.

Broadly speaking, there are three aspects of the present example: (i) determining information about errors that have occurred in the past (e.g., past error information 118*a*) and recording that information in the error information repository 116; (ii) predicting errors that are likely to occur in the future and recording information about those errors (e.g., future error information 118*b*) in the error information repository 116; and (iii) using the past error information 118*a* and the future error information 118*b* to perform targeted repair actions. The method 200 shown in FIG. 2 corresponds to (i), the method 300 shown in FIG. 3 corresponds to (ii), and the method 400 shown in FIG. 4 corresponds to (iii).

Reference is initially made to the method 200 shown in FIG. 2, which can be implemented by the error logging component 120. The method 200 includes monitoring 202 the hardware components 104 of a computing device 102. This can include listening for error signals 122 that are related to the hardware components 104.

At some point, an error signal 122 can be detected 204. The error signal 122 can indicate that a sub-component 108 of a hardware component 104 within the computing device 102 is defective. The method 200 also includes obtaining 206 information identifying the defective sub-component 108. In some embodiments, the information identifying the defective sub-component 108 can be included as part of the error signal 122. Alternatively, the error logging component 120 can obtain information identifying the defective sub-component 108 separately from receiving the error signal 122.

In response to detecting 204 the error signal 122 and obtaining 206 information identifying the defective sub-component 108, the error logging component 120 can record 208 error information 118*a* identifying the defective sub-component 108 in an error information repository 116. The method 200 can then return to monitoring 202 the hardware components 104 of the computing device 102.

In some embodiments, error information 118*a* can be recorded in the error information repository 116 whenever an error signal 122 is detected. Alternatively, in some embodiments, the error logging component 120 can be configured to be more selective about recording error information 118*a* in the error information repository 116. For example, in some embodiments the error logging component 120 can be configured to record error information 118*a* about a particular sub-component 108 only if the number of correctable or repairable errors associated with that sub-component 108 exceeds a predefined threshold value. In some embodiments, different types of thresholds can be utilized in connection with different types of workloads. Workloads that are more sensitive to errors (e.g., gaming) can have lower thresholds than workloads that are less sensitive to errors (e.g., general purpose computing).

Reference is now made to the method 300 shown in FIG. 3, which can be implemented by the predictive failure analysis component 124. The method 300 can include performing 302 predictive failure analysis on the hardware components 104 in the computing device 102. If the predictive failure analysis identifies one or more sub-components 108 that are predicted to be defective, then the method 300 can include recording error information 118*b* identifying the defective sub-component(s) 108 in an error information repository 116.

In some embodiments, predictive failure analysis can be performed periodically. Alternatively, in some embodiments predictive failure analysis can be performed in response to the occurrence of one or more predefined events.

Reference is now made to the method 400 shown in FIG. 4, which can be implemented by the targeted repair component 110 in the system 100 shown in FIG. 1. The method 400 can include waiting 402 for a predetermined event to occur. In some embodiments, the predetermined event can be a reboot of a computing device 102. As another example, the predetermined event can be the passage of a certain amount of time. In other words, the method 400 shown in FIG. 4 can be performed on a periodic basis.

When it is determined 404 that the predetermined event has occurred, the method 400 can include querying 406 an error information repository 116 to determine whether the error information repository 116 includes error information 118 about any defective sub-components 108 within the computing device 102 that should be repaired.

As a result of the querying 406, it could be determined 408 that there are not any defective sub-components 108 within the computing device 102 that should be repaired. For example, if as a result of the querying 406 it is determined that the error information repository 116 does not include any error information 118, the targeted repair component 110 can interpret this as an indication that that there are not any defective sub-components 108 within the computing device 102 that should be repaired. In this case, the method 400 can then return to waiting 402 for the next occurrence of the predetermined event. The method 400 can then proceed as indicated above.

Alternatively, as a result of the querying 406 it could be determined 408 that there is at least one defective sub-component 108 within the computing device 102 that should be repaired. For example, the targeted repair component 110 can receive, in response to the query, information identifying at least one defective sub-component 108 within the computing device 102. In this case, the method 400 can include initiating 410 a targeted repair action for each defective sub-component 108. As discussed above, in some embodiments the computing device 102 can include one or more spare sub-components 114 that can be used in place of a defective sub-component 108. In such embodiments, initiating 410 a targeted repair action with respect to a defective sub-component 108 can include initiating an action that causes a spare sub-component 114 to be used in place of the defective sub-component 108.

In some embodiments, if a spare sub-component 114 is not available to replace a defective sub-component 108 (e.g., because all of the spare sub-components 114 have already been used), then a targeted repair operation can simply include taking some action to prevent the defective sub-component 108 from being used by the computing device 102 (e.g., excluding a defective region of a memory device from a memory map). In some embodiments, the addresses corresponding to repair locations may have to be further translated. For instance, such translation may be performed if there is a change to a memory training policy such as enable or disable of an interleaving scheme. In such cases, the telemetry data should be updated again to reflect new addresses/regions that are mapped out.

In some embodiments, in addition to physical repairs like causing a spare sub-component 114 to be used in place of a defective sub-component 108, targeted repair actions in accordance with the present disclosure can also include logical repairs. This can include disabling options that cause errors to occur at a high level.

In some embodiments, the targeted repair actions can be performed as part of the predetermined event that causes the error information repository 116 to be queried 406. For example, in embodiments where the predetermined event is a boot process, the targeted repair actions can be performed as part of the boot process.

In some embodiments, the targeted repair actions can be performed when the computing device 102 is in a low power state. For example, the targeted repair actions can be performed in response to the computing device 102 going into a low power mode.

At some point, the method 400 can include publishing 412 repair telemetry 126 regarding the targeted repair actions that have been performed. As discussed above, repair telemetry 126 can be provided to and analyzed by one or more entities (e.g., the data analysis component 128) in order to determine characteristics of and trends related to the hardware components 104 in the computing devices 102.

The method 400 can then return to waiting 402 until the next occurrence of the predetermined event. When it is determined 404 that the predetermined event has occurred, the error information repository 116 can be queried 406 again and the rest of the method 400 can proceed as described above.

In some embodiments, the methods 200, 300, 400 shown in FIGS. 2-4 can be performed for each of a plurality of computing devices 102 in a cloud computing system. Performing deferred targeted repairs for the hardware components 104 in a plurality of computing devices 102 can help ensure that the computing devices 102 remain available for providing computing services to users.

Figure 5:
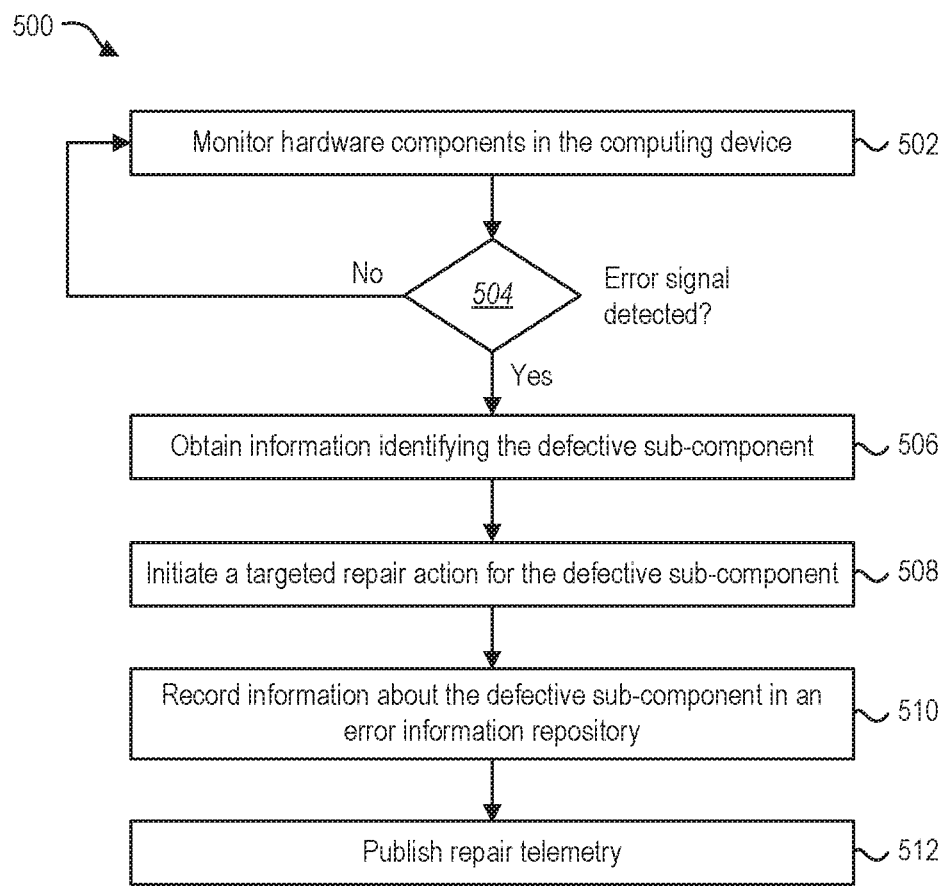
FIG. 5 illustrates an example of a method for performing live targeted repair of a hardware component in a computing device.

FIG. 5 illustrates an example of a method 500 for performing live targeted repair of a hardware component 104 in a computing device 102. More specifically, the method 500 shown in FIG. 5 illustrates various aspects of a scenario in which targeted repair actions can be performed when errors are detected, without waiting for a predetermined event to occur. This method 500 will be described in relation to the system 100 shown in FIG. 1. The method 500 can be implemented by the targeted repair component 110 in the system 100 shown in FIG. 1.

The method 500 includes monitoring 502 the hardware components 104 of a computing device 102. This can include listening for error signals 122 that are related to the hardware components 104. At some point, an error signal 122 can be detected 504. As indicated above, in some embodiments the error signal 122 can be generated by the hardware component 104, by the auxiliary service processor 112, or by another component (either within the computing device 102 or external to the computing device 102) that is monitoring the status of the hardware component 104.

The method 500 also includes obtaining 506 information identifying the defective sub-component 108. In some embodiments, the information identifying the defective sub-component 108 can be included as part of the error signal 122. Alternatively, the targeted repair component 110 can obtain information identifying the defective sub-component 108 separately from receiving the error signal 122. In some embodiments, the targeted repair component 110 can request the information identifying the defective sub-component 108 from another entity (e.g., the hardware component 104, the auxiliary service processor 112) in response to receiving the error signal 122. Alternatively, the targeted repair component 110 can receive the information identifying the defective sub-component 108 separately from the error signal 122 without having to request this information from another entity. In other words, another entity can send the information identifying the defective sub-component 108 to the targeted repair component 110 without being requested to do so by the targeted repair component 110.

The method 500 also includes initiating 508 a targeted repair action for the defective sub-component 108. As discussed above, in some embodiments the computing device 102 can include one or more spare sub-components 114 that can be used in place of a defective sub-component 108. In such embodiments, initiating 508 a targeted repair action with respect to a defective sub-component 108 can include initiating an action that causes a spare sub-component 114 to be used in place of the defective sub-component 108. Other examples of targeted repair actions include taking some action to prevent a defective sub-component 108 from being used by the computing device 102 (e.g., excluding a defective region of a memory device from a memory map) as well as logical repairs such as disabling options that cause errors to occur at a high level.

In some embodiments, after a targeted repair action is performed on a defective sub-component 108, information about the defective sub-component 108 can be recorded 510 in an error information repository 116. This information can then be used to perform one or more additional targeted repair actions during a subsequent boot process. In other words, it can be possible to combine the techniques for live targeted repair (as shown in FIG. 5) with the deferred approach (as shown in FIGS. 2-4). With this "hybrid" approach, one or more targeted repair actions can be performed immediately (or soon thereafter, before another boot process) when an error is detected. In addition, information about the targeted repair action(s) can be recorded in an error information repository 116 and potentially used to initiate one or more additional targeted repair actions during a subsequent boot process.

In some situations, the targeted repair action(s) that are performed during a subsequent boot process can be directed to the same defective sub-component(s) 108 that are the subject of the live targeted repair action(s). Alternatively, in some cases, telemetry after a successful live targeted repair action could serve as circumstantial evidence to identify additional sub-components 106 (e.g., neighborhood memory pages, processor threads) that may be prone to errors and should be repaired as well.

The method 500 can also include publishing 512 repair telemetry 126 regarding the targeted repair actions that have been performed. As discussed above, repair telemetry 126 can be provided to and analyzed by one or more entities (e.g., the data analysis component 128) in order to determine characteristics of and trends related to the hardware components 104 in the computing devices 102.

As discussed above, at least some aspects of the method 400 for deferred targeted repair shown in FIG. 4 can be performed during a boot process (or another predetermined event). In contrast, the method 500 for live targeted repair shown in FIG. 5 can be performed during normal operation of the computing device 102. In other words, the method 500 shown in FIG. 5 can be performed after the computing device 102 has completed a boot process and before the computing device 102 begins another boot process.

Figure 6:
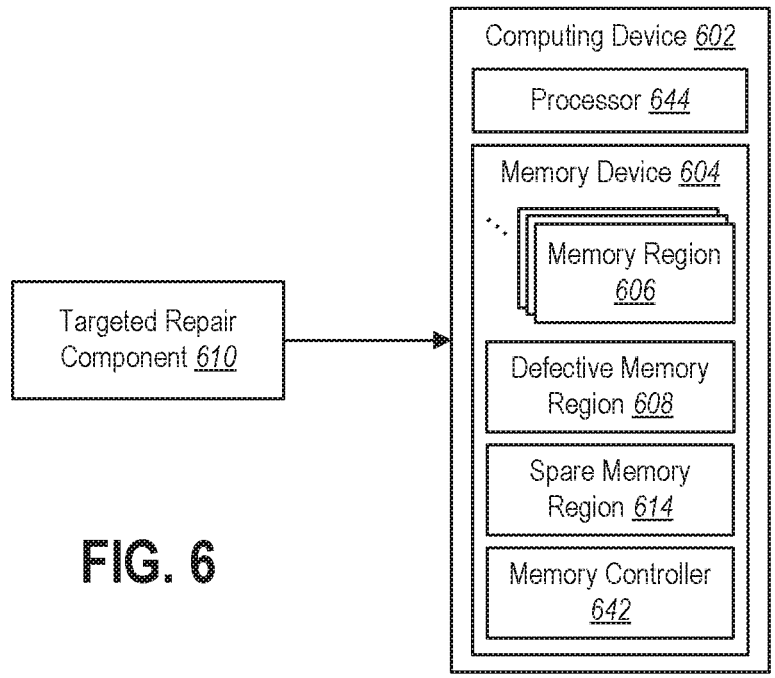
FIG. 6 illustrates an example of a targeted repair action that can be performed when the defective sub-component is a memory region of a memory device.

FIG. 6 illustrates an example of a targeted repair action that can be performed when the defective sub-component 108 is a memory region 608 of a memory device 604. More specifically, FIG. 6 shows a memory device 604 within a computing device 602. The memory device 604 includes a plurality of memory regions 606. The techniques disclosed herein can be useful in a scenario in which most of the memory regions 606 within the memory device 604 are functioning properly, but the memory device 604 includes at least one defective memory region 608.

A targeted repair component 610 can be configured to specifically target the defective memory region 608 for repair without affecting any of the other memory regions 606 that are functioning properly. In the depicted example, it will be assumed that the memory device 604 includes PPR capability. Therefore, the memory device 604 includes a spare memory region 614. The targeted repair component 610 can be configured to perform a PPR operation with respect to the defective memory region 608. The PPR operation can cause the spare memory region 614 to be used in place of the defective memory region 608.

In some embodiments, the memory device 604 can be a synchronous dynamic random access memory (SDRAM) device, such as double data rate (DDR) SDRAM. DDR SDRAM modules can be referred to as DIMMs (Dynamic Inline Memory Modules).

Each DIMM includes at least one memory chip. Each memory chip includes rows and columns of dynamic RAM cells. The memory device 604 includes a memory controller 642, which is coupled to a processor 644 of the computing device 602. The memory controller 642 issues memory transfer requests to read or write data to or from a particular address of a DIMM. The memory controller 642 may also issue other non-data transfer commands to a DIMM, such as PPR commands.

When processing a memory transfer request associated with a particular address, the memory controller 642 determines a DIMM that is associated with the address. The memory controller 642 also determines a column address and a row address of the DIMM that are associated with the address. To read or write data at the designated row and column, the memory controller applies an address signal to indicate a designated row and column of the DIMM to access.

DIMMs may have defective memory regions 608, such as defective rows, columns, chips, or banks. It is also possible for entire DIMMs to be faulty. Some of the faults may be transient (temporary) while other faults may be permanent. PPR capabilities enable DIMMs to address transient and non-transient memory failures. Based on ECC data within a word, a memory controller 642 can detect permanent or transient errors. PPR capabilities permit the memory controller 642 to remap the defective memory region 608 to a spare memory region 614.

There are at least two types of PPR remapping capabilities, referred to as "hard PPR" and "soft PPR." Hard PPR permanently remaps accesses from a defective memory region 608 to a spare memory region 614. A hard PPR remapping survives power cycles. Soft PPR remapping temporarily maps accesses from a defective memory region 608 to a spare memory region 614. A soft PPR remapping can survive a "warm" reboot, but does not survive a power cycle.

As indicated above, the targeted repair component 610 can be configured to perform a PPR operation with respect to the defective memory region 608. In this context, the term "PPR operation" can refer to a hard PPR operation that survives power cycles or to a soft PPR operation that does not survive power cycles. In some embodiments, performing a PPR operation (either a hard PPR operation or a soft PPR operation) includes causing the memory controller 642 to remap the defective memory region 608 to a spare memory region 614.

In the case of deferred targeted repair, the targeted repair component 610 can be configured to perform a hard PPR operation with respect to the defective memory region 608. In the case of live targeted repair, the targeted repair component 610 can be configured to perform a soft PPR operation with respect to the defective memory region 608.

Figure 7:
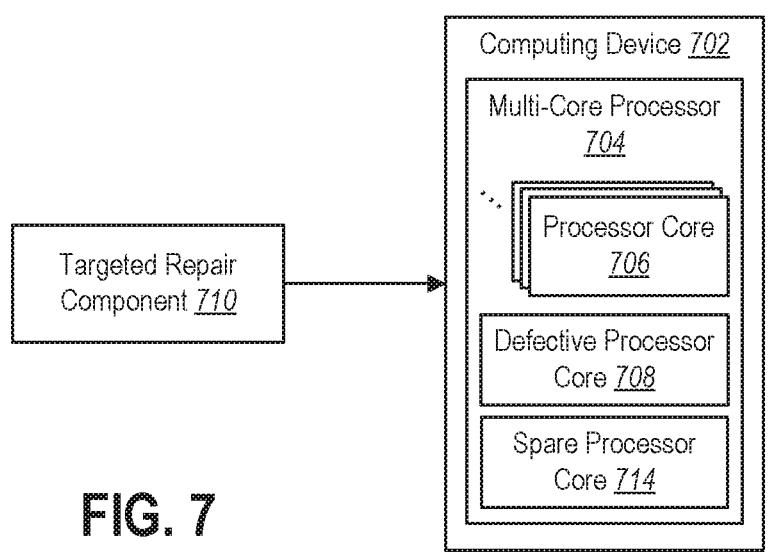
FIG. 7 illustrates an example of a targeted repair action that can be performed when the defective sub-component is a core within a multi-core processor.

FIG. 7 illustrates an example of a targeted repair action that can be performed when the defective sub-component 108 is a core 708 within a multi-core processor 704. More specifically, FIG. 7 shows a processor 704 within a computing device 702. The processor 704 includes a plurality of processor cores 706. The techniques disclosed herein can be useful in a scenario in which most of the processor cores 706 within the multi-core processor 704 are functioning properly, but the multi-core processor 704 includes at least one defective processor core 708.

A targeted repair component 710 can be configured to specifically target the defective processor core 708 for repair without affecting any of the other processor cores 706 that are functioning properly. More specifically, the multi-core processor 704 includes a spare processor core 714. The targeted repair component 710 can be configured to cause the spare processor core 714 to be used in place of the defective processor core 708. This can be referred to as processor (or CPU) core sparing. Processor core sparing can be performed either within a socket or across sockets in a multi-socket scenario.

Figure 8:
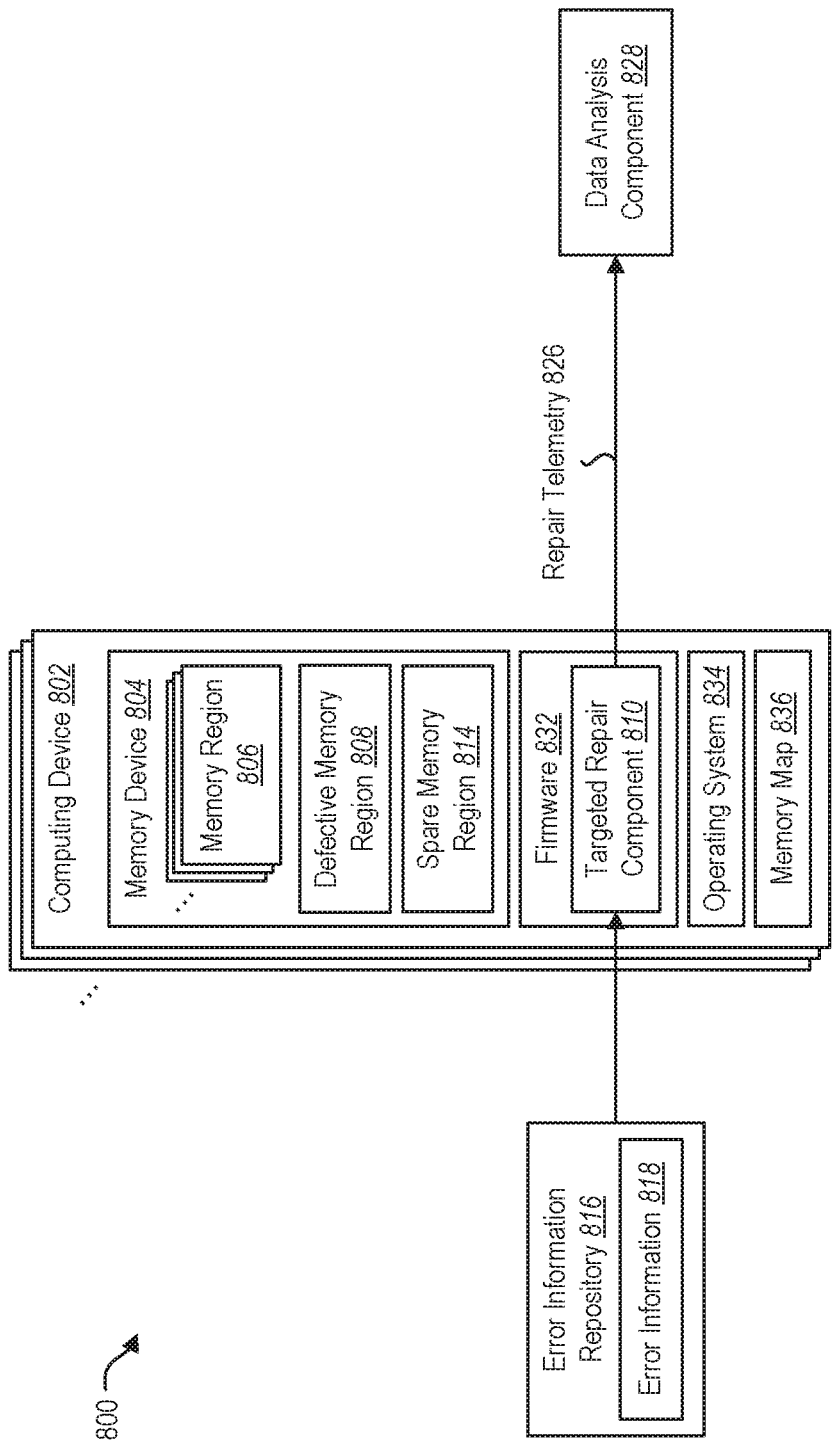
FIG. 8 illustrates an example of a system that is configured for targeted repair of memory regions in a memory device.

FIG. 8 illustrates another example of a system 800 in which the techniques disclosed herein can be utilized. The system 800 shown in FIG. 8 is similar in some respects to the system 100 that was described above in connection with FIG. 1. For example, the system 800 includes a plurality of computing devices 802, which can be part of a cloud computing system. The system 800 also includes a targeted repair component 810, an error information repository 816 that is configured to store error information 818, and a data analysis component 828 that is configured to receive repair telemetry 826 from the targeted repair component 810. These components can include some or all of the characteristics of the corresponding components that were described above in connection with FIG. 1.

In FIG. 8, a computing device 802 is shown with a memory device 804. The memory device 804 includes a plurality of memory regions 806. As discussed above, the techniques disclosed herein can be useful in a scenario in which most of the memory regions 806 within the memory device 804 are functioning properly, but the memory device 804 includes at least one defective memory region 808. The memory device 804 also includes a spare memory region 814, which can be used to replace the defective memory region 808.

In the example shown in FIG. 8, the targeted repair component 810 can be implemented within the firmware 832 of the computing device 802. The targeted repair component 810 can be configured to specifically target defective sub-components (e.g., one or more defective memory regions 808) for repair without affecting any of the other sub-components (e.g., memory regions 806) that are not defective. The targeted repair component 810 can be configured to initiate targeted repair action(s) during a boot process of the computing device 802. More specifically, the targeted repair action(s) can be performed before the memory device 804 has been initialized for the ongoing boot cycle. In other words, these actions can be performed before a memory map 836 has been established for the ongoing boot cycle and before the operating system 834 has been booted.

Figure 9:
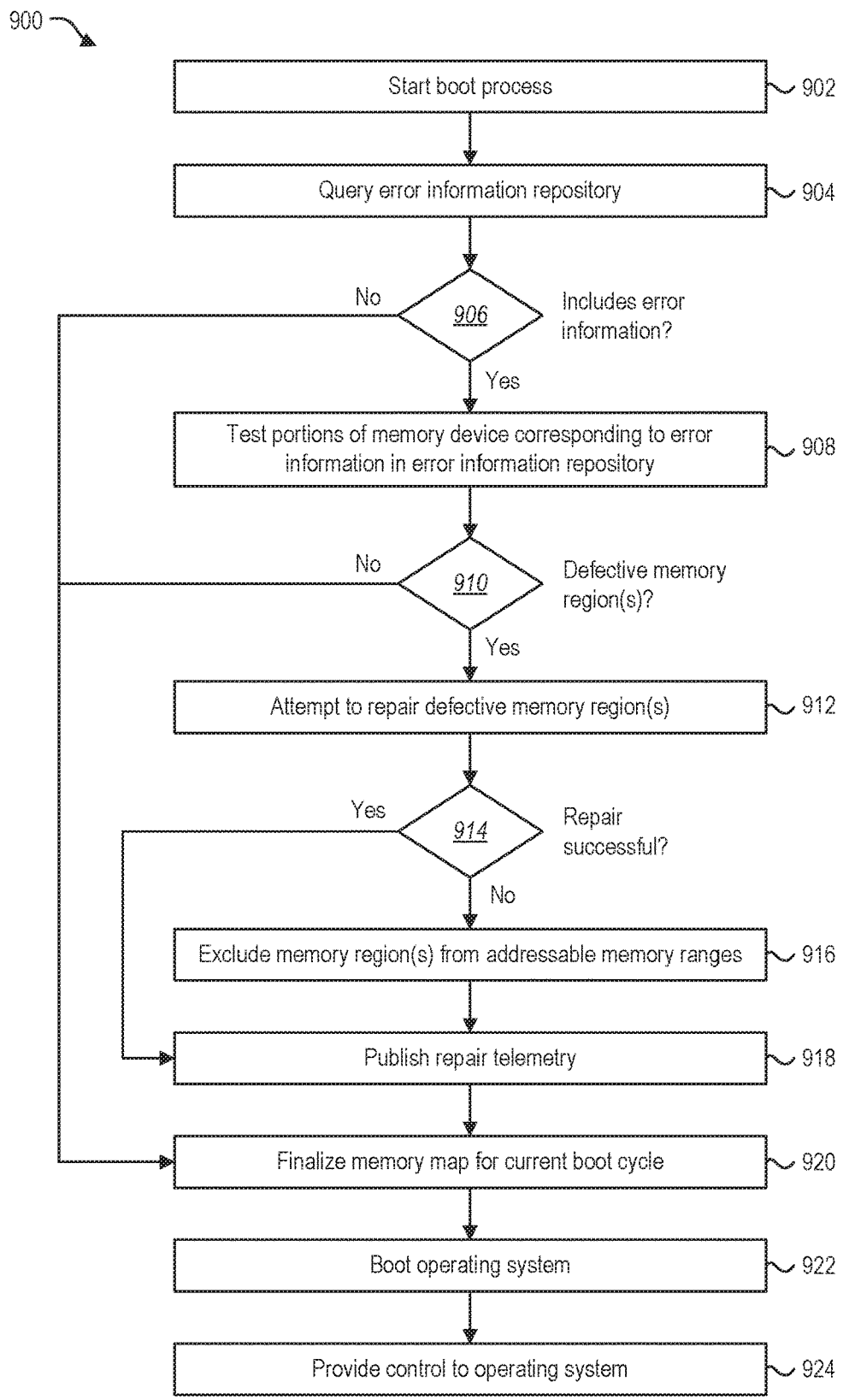
FIG. 9 illustrates an example of a method that can be performed as part of deferred targeted repair of memory regions in a memory device.

FIG. 9 illustrates another example of a method 900 that can be performed as part of deferred targeted repair. The method 900 will be described in relation to the system 800 shown in FIG. 8. The method 900 shown in FIG. 9 is specifically directed to performing deferred targeted repair in relation to a memory device, such as the memory device 804 in the computing device 802 shown in FIG. 8. In some embodiments, the method 900 can be implemented by firmware 832 within the computing device 802. The method 900 can be performed as part of a boot process.

The method 900 can include starting 902 a boot process. As part of the boot process, the method 900 can include querying 904 an error information repository 816 to determine whether the error information repository 816 includes any error information 818 about one or more potentially defective memory regions 808 within the memory device 804. If it is determined 906 that the error information repository 816 does not include any such error information 818, then the method 900 can proceed to finalizing 920 the memory map 836 for the current boot cycle, booting 922 the operating system 834, and providing 924 control to the operating system 834.

However, if it is determined 906 that the error information repository 816 includes error information 818 about one or more potentially defective memory regions 808 within the memory device 804, then the method 900 can include testing 908 portions of the memory device 804 corresponding to the error information 818. It is possible that the error information repository 816 may include error information 818 about memory region(s) 806 that may not need to be repaired. For example, certain kinds of errors may be transient in nature and may not require repair. Testing can be performed 908 based on the error information 818 to determine whether the memory region(s) 806 corresponding to the error information 818 in the error information repository 816 are the kinds of errors that should be repaired. In some embodiments, vendor-specific test content can be used to test 908 portions of the memory device 804. The use of vendor-specific test content can enable more targeted and/or more rigorous tests to be performed. In this context, the term "vendor" can refer to a component vendor or a system vendor.

If as a result of the testing it is determined 910 that there are one or more defective memory regions 808 within the memory device 804 that should be repaired, then the method 900 can include attempting 912 to repair the defective memory region(s) 808. In some embodiments, this can include attempting to modify the memory device 804 so that one or more spare memory regions 814 are used in place of the defective memory region(s) 808.

If it is determined 914 that the attempt to repair the defective memory region(s) 808 is unsuccessful (e.g., because all of the spare memory regions 814 within the memory device 804 have already been used), the defective memory region(s) 808 can be excluded 916 from addressable memory ranges in the memory map 836 that is created for the ongoing boot cycle.

The method 900 can also include publishing 918 repair telemetry 826. The repair telemetry 826 can identify any defective memory region(s) 808 that were identified 910 as a result of the testing 908. The method 900 can then proceed to finalizing 920 the memory map 836 for the current boot cycle, booting 922 the operating system 834, and providing 924 control to the operating system 834.

The actions of querying 904 the error information repository 816 and determining 906 whether the error information repository 816 has error information 818, testing 908 portions of the memory device 804 corresponding to the error information 818 and determining 910 whether those portions of the memory device 804 include defective memory regions 808, attempting 912 to repair the defective memory region(s) 808 and determining 914 whether the attempted repair(s) are successful, and excluding 916 the defective memory region(s) 808 (if necessary) from addressable memory ranges in the memory map 836 can be performed before the memory has been initialized for the ongoing boot cycle. In other words, these actions can be performed before a memory map 836 has been established for the ongoing boot cycle.

In this context, the term "boot cycle" refers to a period of time that begins when a computing device 802 is initially booted and that ends when the computing device 802 is rebooted or powered off. At the beginning of a boot cycle, a boot process is executed. As part of the boot process, a memory map 836 is created for that boot cycle. The memory map 836 remains in effect until the computing device 802 is powered off or rebooted.

Figure 10:
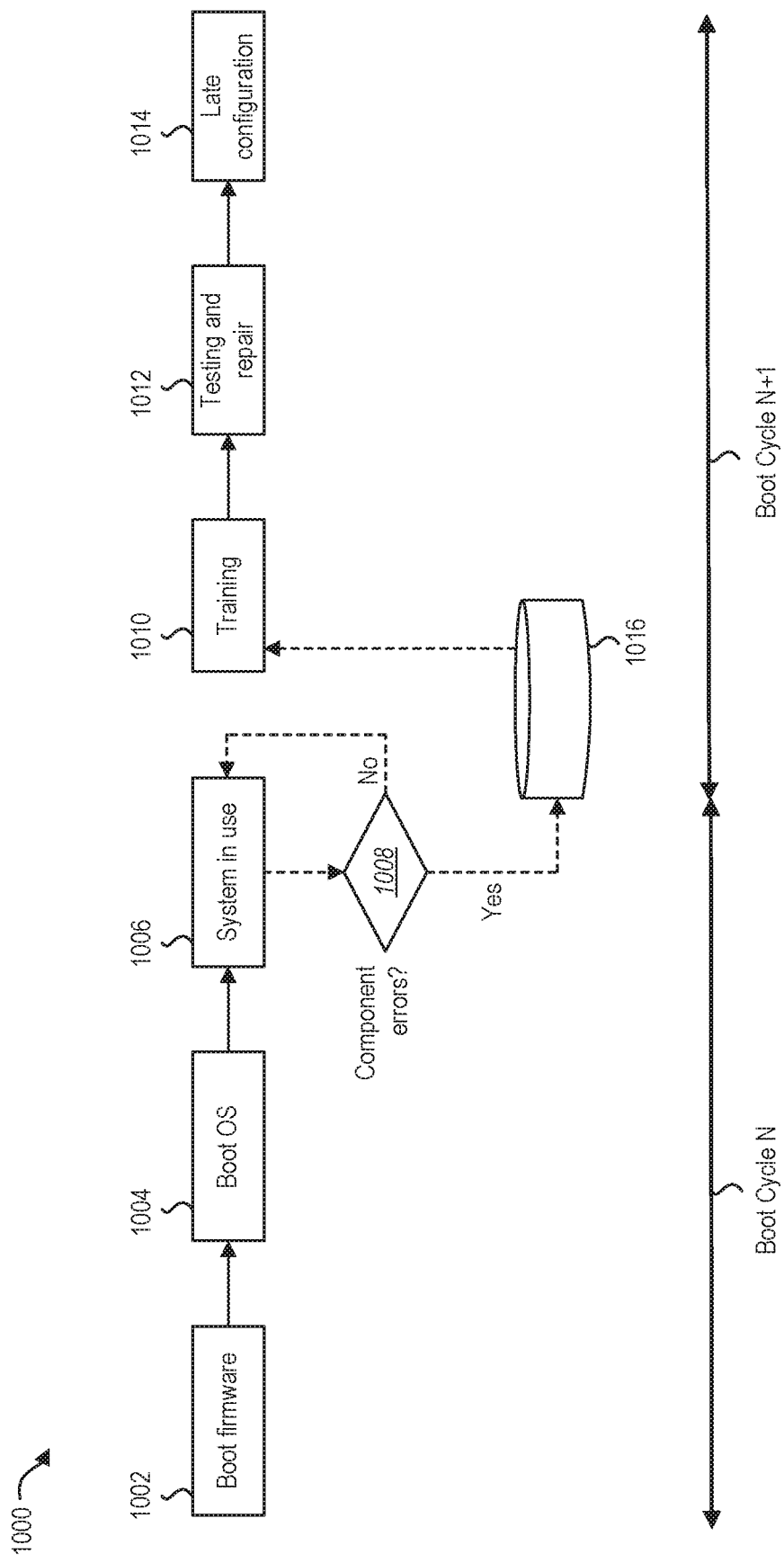
FIG. 10 illustrates another example of a method for performing deferred targeted repair of hardware components in a computing device.

FIG. 10 illustrates an example of a method 1000 for performing deferred targeted repair of hardware components in a computing device. The method 1000 will be described in relation to two consecutive boot cycles, which will be referred to as boot cycle N and boot cycle N+1.

At the start of boot cycle N, a computing device can start a boot process. This includes booting 1002 firmware and booting 1004 an operating system. Following the boot process, the computing device enters a state 1006 of being in use. If sub-components of hardware components within the computing device experience errors 1008 while in this state 1006, the errors can be logged to an error information repository 1016.

Boot cycle N ends when the computing device is powered off or rebooted. Boot cycle N+1 begins when the computing device is rebooted. At the start of boot cycle N+1, a training phase 1010 can be entered. One or more sub-components of a hardware component can be tested and/or repaired 1012 based on error information contained in the error information repository 1016. The testing and/or repair 1012 can be performed in accordance with actions 908 through 918 of the method 900 that was described above in connection with FIG. 9.

A late configuration 1014 of the hardware component can be performed based on the results of the testing and repair 1012. The late configuration 1014 can be performed as part of the boot process. The late configuration 1014 can include finalizing a memory map for boot cycle N+1.

Figure 11:
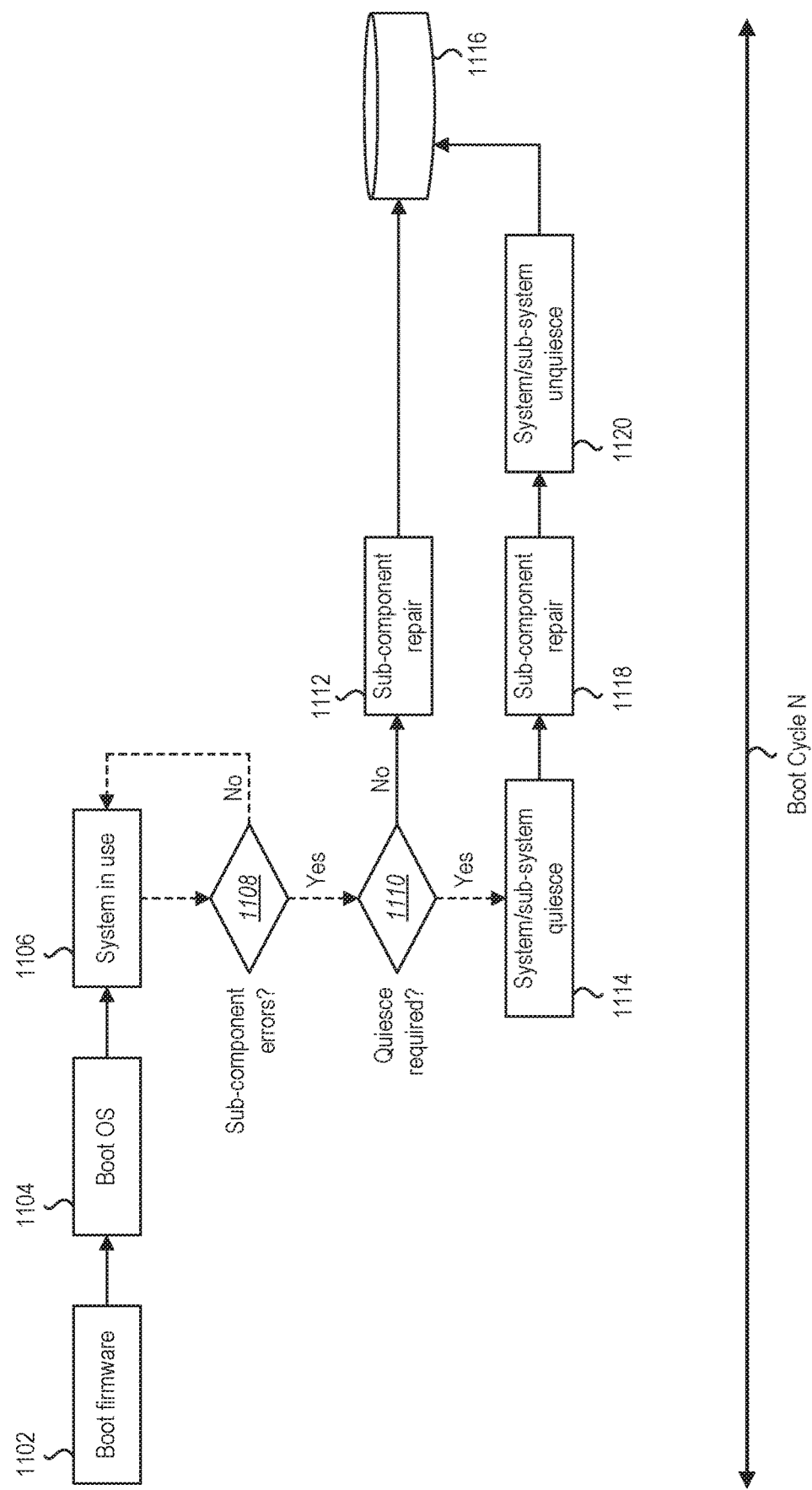
FIG. 11 illustrates another example of a method for performing live targeted repair of hardware components in a computing device.

FIG. 11 illustrates an example of a method 1100 for performing live targeted repair of hardware components in a computing device. The method 1100 will be described in relation to a boot cycle that will be referred to as boot cycle N.

At the start of boot cycle N, a computing device can start a boot process. This includes booting 1102 firmware and booting 1104 an operating system. Following the boot process, the computing device enters a state 1106 of being in use. If sub-components of hardware components within the computing device experience errors 1108 while in this state 1106, live targeted repair of those sub-components can be performed.

In response to detecting an error 1108, a determination can be made 1110 about whether at least some part of the computing device (e.g., the hardware component comprising the specific sub-component that should be repaired) should be quiesced before a targeted repair operation is performed. In this context, the term "quiesce" refers to reducing an activity level. For example, quiescing a computing device (or one or more components thereof) can involve temporarily suspending activity of the computing device.

If it is determined 1110 that quiescing is not necessary, then targeted repair of the sub-component can be performed 1112, and telemetry associated with the repair can be logged in an error information repository 1116.

If it is determined 1110 that at least some part of the computing device should be quiesced, then such quiescing can occur 1114 prior to targeted repair being performed 1118. After the targeted repair(s) have been completed, whatever part(s) of the computing device were quiesced can be unquiesced 1120. In other words, the quiescing 1114 can be reversed. Telemetry associated with the repair can then be logged in an error information repository 1116.

Figure 12:
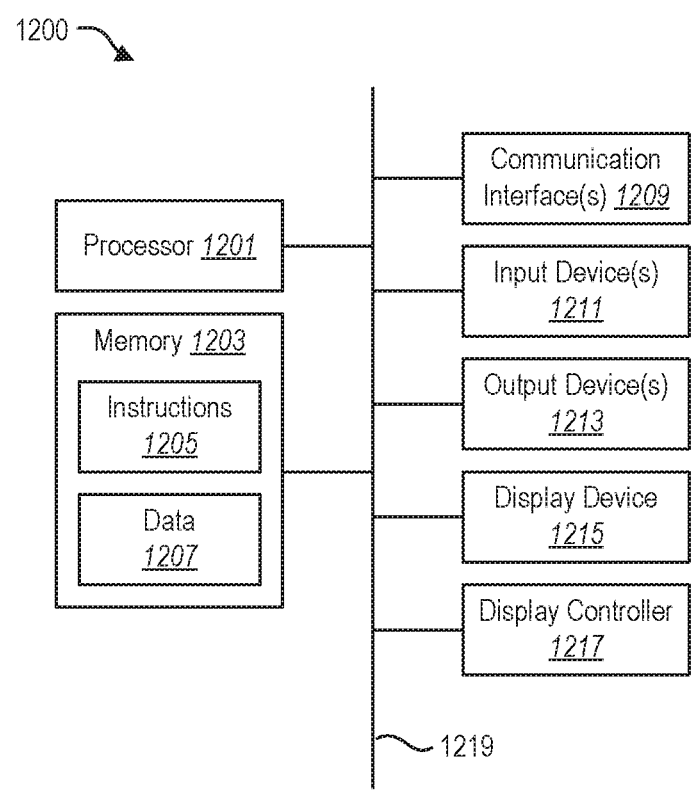
FIG. 12 illustrates certain components that can be included within a computing device.

Reference is now made to FIG. 12. One or more computing devices 1200 can be used to implement at least some aspects of the techniques disclosed herein. FIG. 12 illustrates certain components that can be included within a computing device 1200.

The computing device 1200 includes a processor 1201 and memory 1203 in electronic communication with the processor 1201. Instructions 1205 and data 1207 can be stored in the memory 1203. The instructions 1205 can be executable by the processor 1201 to implement some or all of the methods, steps, operations, actions, or other functionality that is disclosed herein. Executing the instructions 1205 can involve the use of the data 1207 that is stored in the memory 1203. Unless otherwise specified, any of the various examples of modules and components described herein can be implemented, partially or wholly, as instructions 1205 stored in memory 1203 and executed by the processor 1201. Any of the various examples of data described herein can be among the data 1207 that is stored in memory 1203 and used during execution of the instructions 1205 by the processor 1201.

Although just a single processor 1201 is shown in the computing device 1200 of FIG. 12, in an alternative configuration, a combination of processors (e.g., an ARM and DSP) could be used.

The computing device 1200 can also include one or more communication interfaces 1209 for communicating with other electronic devices. The communication interface(s) 1209 can be based on wired communication technology, wireless communication technology, or both. Some examples of communication interfaces 1209 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computing device 1200 can also include one or more input devices 1211 and one or more output devices 1213. Some examples of input devices 1211 include a keyboard, mouse, microphone, remote control device, button, joystick, trackball, touchpad, and lightpen. One specific type of output device 1213 that is typically included in a computing device 1200 is a display device 1215. Display devices 1215 used with embodiments disclosed herein can utilize any suitable image projection technology, such as liquid crystal display (LCD), light-emitting diode (LED), gas plasma, electroluminescence, wearable display, or the like. A display controller 1217 can also be provided, for converting data 1207 stored in the memory 1203 into text, graphics, and/or moving images (as appropriate) shown on the display device 1215. The computing device 1200 can also include other types of output devices 1213, such as a speaker, a printer, etc.

The various components of the computing device 1200 can be coupled together by one or more buses, which can include a power bus, a control signal bus, a status signal bus, a data bus, etc. For the sake of clarity, the various buses are illustrated in FIG. 12 as a bus system 1219.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" can refer to a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein.

The term "memory" can refer to any electronic component capable of storing electronic information. For example, memory may be embodied as random access memory (RAM), read-only memory (ROM), magnetic disk storage media, optical storage media, flash memory devices in RAM, various types of storage class memory, on-board memory included with a processor, erasable programmable read-only memory (EPROM), electrically erasable programmable read-only memory (EEPROM) memory, registers, and so forth, including combinations thereof.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for targeted repair of a hardware component in a computing device that is part of a cloud computing system, comprising:
   monitoring a plurality of hardware components in the computing device;
   querying an error information repository during a boot process of the computing device, the error information repository being maintained in non-volatile storage, the error information repository comprising error information identifying a defective sub-component within the hardware component of the computing device, the hardware component also comprising at least one sub-component that is functioning properly and a spare component that can be used in place of the defective sub-component;
   obtaining the error information identifying the defective sub-component in response to the querying; and
   performing a targeted repair action during the boot process of the computing device, wherein the targeted repair action prevents the defective sub-component from being used by the computing device and allows the at least one sub-component that is functioning properly to be used by the computing device, and wherein the targeted repair action causes the spare component to be used in place of the defective sub-component, wherein
   the hardware component comprises a multi-core processor;
   the defective sub-component comprises a defective processor core;
   the multi-core processor further comprises at least one processor core that is functioning properly and a spare processor core that can be used in place of the defective processor core; and
   performing the targeted repair action causes the spare processor core to be used in place of the defective processor core, wherein the targeted repair action prevents the defective processor core from being used by the computing device without preventing the at least one processor core that is functioning properly from being used by the computing device.

2. The method of claim 1, wherein identifying the defective sub-component comprises:
   detecting an error signal indicating that the hardware component includes the defective sub-component; and
   obtaining error information that identifies the defective sub-component.

3. The method of claim 1, wherein:
   the hardware component comprises a memory device that is configured with post package repair (PPR) capability;
   the defective sub-component comprises a defective memory region;
   the memory device comprises a spare memory region that can be used in place of the defective memory region; and
   performing the targeted repair action comprises performing a PPR operation that causes the spare memory region to be used in place of the defective memory region.

4. A system for targeted repair of a hardware component in a computing device, comprising:
   at least one processor;
   memory communicatively coupled to the at least one processor; and
   instructions stored in the memory, the instructions being executable by the at least one processor to:
      perform predictive failure analysis on hardware components of the computing device;
      identify a defective sub-component based at least in part on the predictive failure analysis;
      record error information identifying the defective sub-component in an error information repository;
      query the error information repository during a boot process of the computing device, the error information repository being maintained in non-volatile storage, the error information repository comprising the error information identifying the defective sub-component within the hardware component, the hardware component also comprising at least one sub-component that is not defective;
      obtain the error information identifying the defective sub-component in response to the querying; and
      perform a targeted repair action on the defective sub-component during the boot process of the computing device, wherein the targeted repair action alters the hardware component to prevent the defective sub-component from being used by the computing device and allows the at least one sub-component that is not defective to be used by the computing device.

5. The system of claim 4, wherein the instructions are further executable by the at least one processor to:
   detect an error signal corresponding to the defective sub-component; and
   record the error information identifying the defective sub-component in the error information repository.

6. The system of claim 4, wherein:
   the hardware component additionally comprises a spare sub-component that can be used in place of the defective sub-component; and the targeted repair action causes the spare sub-component to be used in place of the defective sub-component.

7. The system of claim 4, wherein:
the hardware component comprises a memory device that is configured with post package repair (PPR) capability;
the defective sub-component comprises a defective memory region;
the memory device comprises a spare memory region that can be used in place of the defective memory region; and
performing the targeted repair action comprises performing a PPR operation that causes the spare memory region to be used in place of the defective memory region.

8. The system of claim 7, wherein the instructions are further executable by the at least one processor to test portions of the memory device corresponding to the error information in the error information repository, the testing being performed prior to the targeted repair action.

9. The system of claim 7, wherein:
a predetermined event comprises a boot process of the computing device; and
the targeted repair action is performed during the boot process, before a memory map is finalized for a current boot cycle.

10. The system of claim 4, wherein:
the hardware component comprises a multi-core processor;
the defective sub-component comprises a defective processor core;
the multi-core processor further comprises at least one processor core that is functioning properly and a spare processor core that can be used in place of the defective processor core; and
performing the targeted repair action causes the spare processor core to be used in place of the defective processor core, wherein the targeted repair action prevents the defective processor core from being used by the computing device without preventing the at least one processor core that is functioning properly from being used by the computing device.

11. The system of claim 4, wherein the instructions are further executable by the at least one processor to publish repair telemetry corresponding to the targeted repair action.

12. A method for live targeted repair of a memory device in a computing device, comprising:
detecting an error signal indicating that the memory device includes a defective memory region, the memory device also comprising at least one functioning memory region that is not defective and a spare memory region that can be used in place of the defective memory region, the memory device being configured with post package repair (PPR) capability, the error signal being detected while the computing device is operating;
obtaining error information that identifies the defective memory region; and
initiating a PPR operation on the defective memory region while the computing device is operating and is not performing a boot process, the PPR operation causing the spare memory region to be used in place of the defective memory region, wherein:
the memory device comprises a multi-core processor;
the defective memory region comprises a defective processor core;
the multi-core processor further comprises at least one processor core that is functioning properly and a spare processor core that can be used in place of the defective processor core; and
performing the targeted PPR operation causes the spare processor core to be used in place of the defective processor core, wherein the targeted PPR operation prevents the defective processor core from being used by the computing device without preventing the at least one processor core that is functioning properly from being used by the computing device.

13. The method of claim 12, wherein:
the memory device additionally comprises a spare memory region that can be used in place of the defective memory region; and
the targeted PPR operation causes the spare memory region to be used in place of the defective memory region.

* * * * *